United States Patent [19]
Hewitt

[11] Patent Number: 5,566,555
[45] Date of Patent: Oct. 22, 1996

[54] VAPOR RECOVERY SYSTEM WITH REFRIGERATION AND REGENERATION CYCLES

[76] Inventor: J. Paul Hewitt, P.O. Box 1091, Angleton, Tex. 77515

[21] Appl. No.: 411,271

[22] Filed: Mar. 27, 1995

[51] Int. Cl.$^6$ .................................................. F25J 3/00
[52] U.S. Cl. .................... 62/623; 62/617; 62/912
[58] Field of Search ..................... 62/11, 13, 23, 62/27, 40, 606, 912, 623, 617

[56] References Cited

U.S. PATENT DOCUMENTS

| | | | |
|---|---|---|---|
| 3,554,904 | 1/1971 | Humphries | 62/23 X |
| 3,894,942 | 7/1975 | Mair | 62/27 X |
| 4,923,492 | 5/1990 | Hewitt | 62/11 |
| 5,006,138 | 4/1991 | Hewitt | 62/18 |
| 5,017,240 | 5/1991 | Brown | 134/22.1 |
| 5,076,822 | 12/1991 | Hewitt | 62/18 |
| 5,144,807 | 9/1992 | Brown | 62/20 |
| 5,176,002 | 1/1993 | O'Brien | 62/11 X |
| 5,426,945 | 6/1995 | Menzenski | 62/11 |
| 5,450,728 | 9/1995 | Vora et al. | 62/23 |

OTHER PUBLICATIONS

Katz, Cornell, Kobayashi, et al. Handbook of Natural Gas Engineering 1959, pp. 512–513.

Burklin, Colley & Owen. Background Information on Hydrocarbon Emissions From Marine Terminal Operations vol. I Discussions. Nov. 1976, p. 139–146.

Primary Examiner—Christopher Kilner
Attorney, Agent, or Firm—Kenneth H. Johnson

[57] ABSTRACT

A vapor recovery system is provided which includes a vapor recovery cycle and a regeneration cycle. The vapor recovery is condensation of the vapors in an air-vapor mixture utilizing a chiller cooled by a refrigerant gas to condense and remove vapor and to vent the air. The refrigerant cooling is provided by a compression-condensation-expansion refrigeration cycle. During the vapor recovery cycle ice tends to build up in the chiller due to the small amounts of water contained in the air-vapor mixture. In the regeneration cycle the hot refrigerant gas from the compressor by-passes the condenser and expansion valve to heat the "chiller", which heats the air-vapor mixture and melts any accumulated ice. During the regeneration cycle there is no venting and the entire air-vapor mixture is recycled to the chiller until the regeneration is completed. In addition to heating and meting ice in the system, the heated air-vapor mixture may be used to dry and regenerate desiccant material in the system.

14 Claims, 4 Drawing Sheets

VAPOR RECOVERY SYSTEM WITH REFRIGERATION AND REGENERATION CYCLES

BACKGROUND OF THE INVENTION

1. Field of the Invention

The present invention relates to closed cycle refrigeration systems, particularly for removing excessive hydrocarbons or other chemicals from air-vapor mixtures by condensation and method for regenerating such systems.

2. Related Information

Environmental concerns have led to a requirement for the reduction of chemical vapors, particularly hydrocarbons emitted into the atmosphere from every possible source. One of the sources targeted are bulk loading and unloading terminals. In these terminals a vapor recovery system is used to gather the air containing hydrocarbons or other vapors which are emitted during loading and unloading operations. The vapors are commonly separated from the air by refrigeration of the air-vapor mixture to cryogenic temperatures. The refrigeration systems can reduce "condensable" hydrocarbons or other condensable materials in the vented air to acceptable levels, i.e., less than 80 mg/l.

Over time, the chiller section of the refrigeration system becomes clogged with ice due to the carry over of water into the cryogenic section requiring defrosting. Additionally, if desiccant type driers are used, they too have to be regenerated by passing heated air or other dry medium through the desiccant beds. Conventionally the defrosting has been accomplished by passing a heated brine solution through those components which have been clogged with ice.

SUMMARY OF THE INVENTION

Briefly the present invention relates to closed cycle refrigeration systems for removing excessive hydrocarbons or other chemicals from air-vapor mixtures by condensation and regenerating utilizing hot refrigerant by by-passing the compressed refrigerant around the condenser and sending it directly to the chiller where it heats the incoming vapors instead of cooling them. The heated vapors are recirculated to prevent emitting hydrocarbons during the regeneration cycle. Additionally, a portion of the heated vapors (air-vapor mixture) may be recirculated through any desiccant type driers if used.

DETAILED DESCRIPTION OF THE INVENTION

The cryogenic temperatures required, i.e., about −100° F., necessitate efficient refrigeration to achieve the separation. Since the total amount of refrigeration, expressed in tons (1 ton=12,000 BTU removed), is small when compared to large scale plants, such as ice plants and gas liquefaction plants, less efficient closed refrigeration cycles can be used with the common fluorocarbon refrigerants such as Freon 12.

With less efficient refrigerants, greater circulation and more compression power is required. Cascade refrigeration, using two refrigerants—one to cool the other—is an alternative. The most commonly used closed refrigeration cycle in these smaller scale plants is the compression of the refrigerant followed by cooling at the higher pressure and expansion across a Joules-Thomson expansion valve, the cycle being used to cool both refrigerants in the cascade refrigeration system.

A turboexpander may be used when the refrigerant is at a "free" higher pressure. The use of a turboexpander in a refrigeration system for vapor recovery is disclosed in my earlier U.S. Pat. No. 4,923,492 which is incorporated herein.

For a detailed description of the preferred embodiments of the present invention the reader is referred to the accompanying figures.

Figure 1:
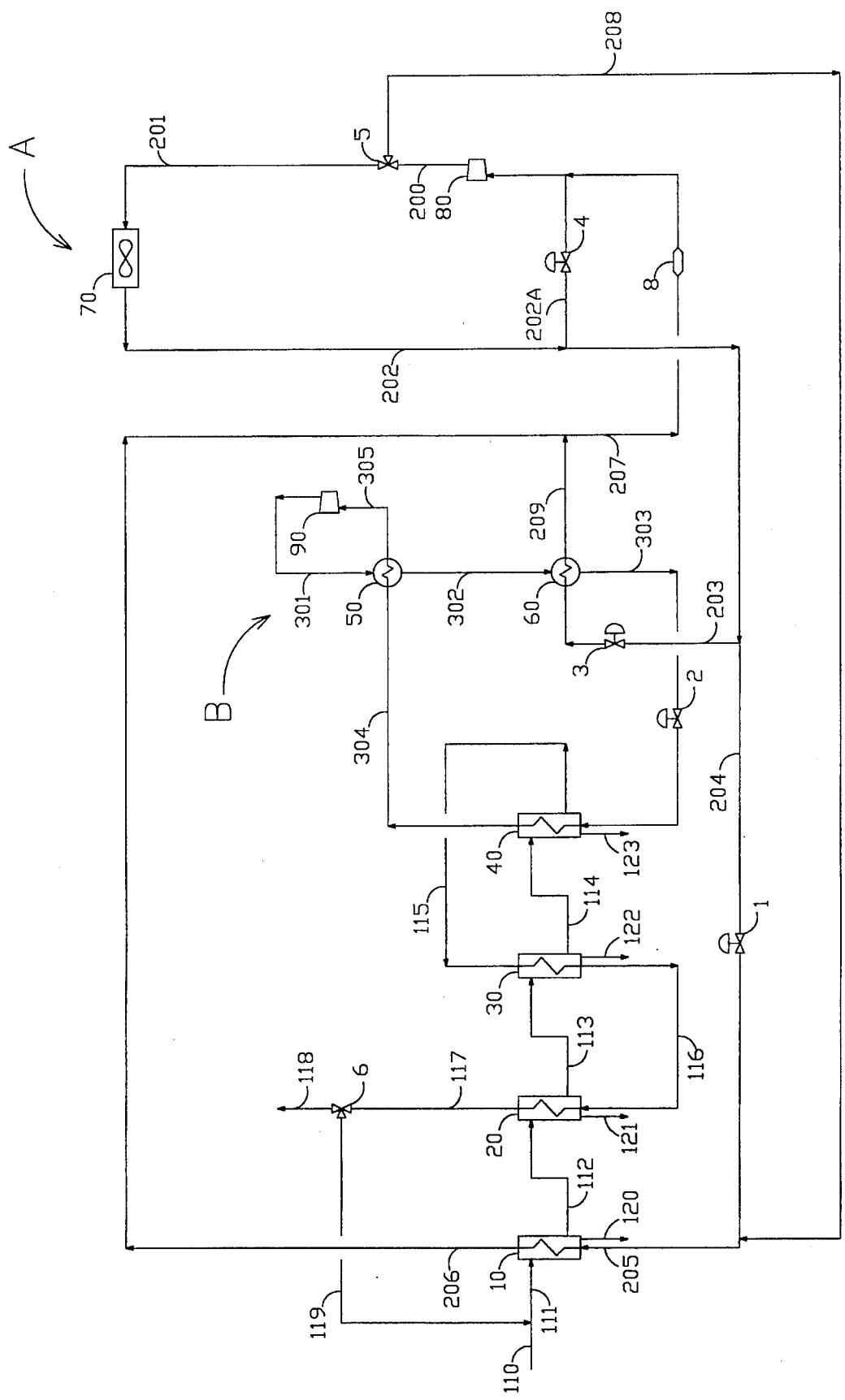
FIG. 1 is a simplified flow diagram of one vapor recovery system using the defrosting method of the present invention.

FIG. 1 depicts a simplified flow diagram of a refrigeration type vapor recovery system which utilizes a cascade refrigeration system to achieve the necessary cryogenic temperatures to condense substantially all of the vapors in an air-hydrocarbon mixture. Much auxiliary equipment, such as temperature control valves, hot gas by-passes, refrigerant receivers, etc., has been omitted from the drawing for simplicity, but those experienced in the art of refrigeration will recognize the usual location of such conventional parts.

The collected vapors are passed via flow lines 110 and 111 to a precooler 10 where the temperature is lowered to about 30°–40° F. by indirect heat exchange with a refrigerant which enters through flow line 205 and exits through flow line 206. In precooler 10 a major portion of the water vapor and some of the hydrocarbon vapors are condensed and removed through drain 120.

The exiting air-hydrocarbon mixture in flow line 112 is then passed through interchangers 20 and 30 where the mixture is further cooled by indirect heat exchange with the cold air from the chiller 40. Additional water and hydrocarbon vapors are also condensed in the interchangers and removed through drains 121 and 122. The air-hydrocarbon mixture is then passed to the chiller 40 where it is cooled to a cryogenic temperature of about −100° F. by indirect heat exchange with refrigerant entering through flow line 303 and exiting through flow line 304. The cryogenic temperature condenses substantially all of the remainder of the hydrocarbons which are removed by drain 123. The drains 120, 121, 122 and 123 may all be connected to a collection header (not shown) for recovery. The now clean air is passed through the interchangers 30 and 20 where it cools the incoming mixture and is heated to above the freezing point of the air before venting through flow lines 117 and 118.

Turning now to the refrigerant cycle, which is of the cascade type, there is a first high temperature stage refrigeration system (generally at A, FIG. 1) and a low temperature stage refrigeration system (generally at B, FIG. 1). Each stage comprises a compression-condensation-expansion cycle. In the high temperature stage, the refrigerant, Freon R-502 for example, exits the compressor 80 though flow line 200 and is passed to an air cooled condenser 70. The condensed refrigerant exits the condenser through flow line 202 and a portion is passed to the precooler 10 via flow lines 204 and 205. Expansion valve 1 lowers the pressure and thus evaporates the refrigerant to provide the cooling necessary in the precooler 10. The remainder of the condensed refrigerant from the condenser 70 is passed via flow line 203 to the low temperature stage condenser 60 after being expanded across expansion valve 3 to provide the cooling necessary to condense the compressed refrigerant from the low temperature stage system. The high temperature stage refrigerant returning in flow lines 206 and 209 are combined in flow line 207 and returned to the suction of the compressor 80. In the low temperature stage the refrigerant, Freon R-503 for example, is compressed by compressor 90 and pre-cooled by indirect heat exchange with the returning refrigerant fin exchanger 50 and then condensed by indirect heat exchange with cold refrigerant from the high temperature stage in condenser 60 and then expanded across expansion valve 2 to decrease its temperature to about −120° F. before entering the chiller 40. The returning refrigerant in flow line 304 is passed though heat exchanger 50 where it is heated by indirect heat exchange with hot compressed refrigerant to increase its temperature to about −50° F. before being returned to the suction of compressor 90.

During the vapor recovery cycle, condensed water is continuously freezing on the tube walls of the two interchangers 20 and 30 and the chiller 40. The system must periodically be shut down and the frozen water vapor defrosted. The defrost is accomplished by programming the low temperature stage system to be stopped and the high temperature stage system to shift into a heat pump mode.

The heat pump mode is accomplished by the use of two three-way valves 5 and 6. Flow control valve 5 shifts to allow the hot refrigerant gas exiting the compressor 80 to by-pass the air cooled condenser 70. The hot refrigerant at about 250° F. is passed directly to the precooler 10 where it now heats the incoming air-hydrocarbon vapor mixture. Flow control valve 6 shifts the vapors leaving interchanger 20 from vent line 118 to recirculation flow line 119. Thus during regeneration no emissions are made.

The hot refrigerant gas at a temperature of 250° F. passes through the tubes of the precooler 10 heating the recirculated air to about 200° F. The heated recirculated air continues through interchangers 20 and 30 and through chiller 40 defrosting any accumulated ice. The defrost liquids are removed through drains 121, 122 and 123.

The hot refrigerant gases returning to the high temperature stage compressor 80 are too hot to enter the compressor. The hot gasses are thus passed through desuperheater 8 for expansion and cooling prior to being returned to the compressor suction. Thus the defrost cycle can be achieved without the expensive brine recirculation system now currently in use.

Figure 2:
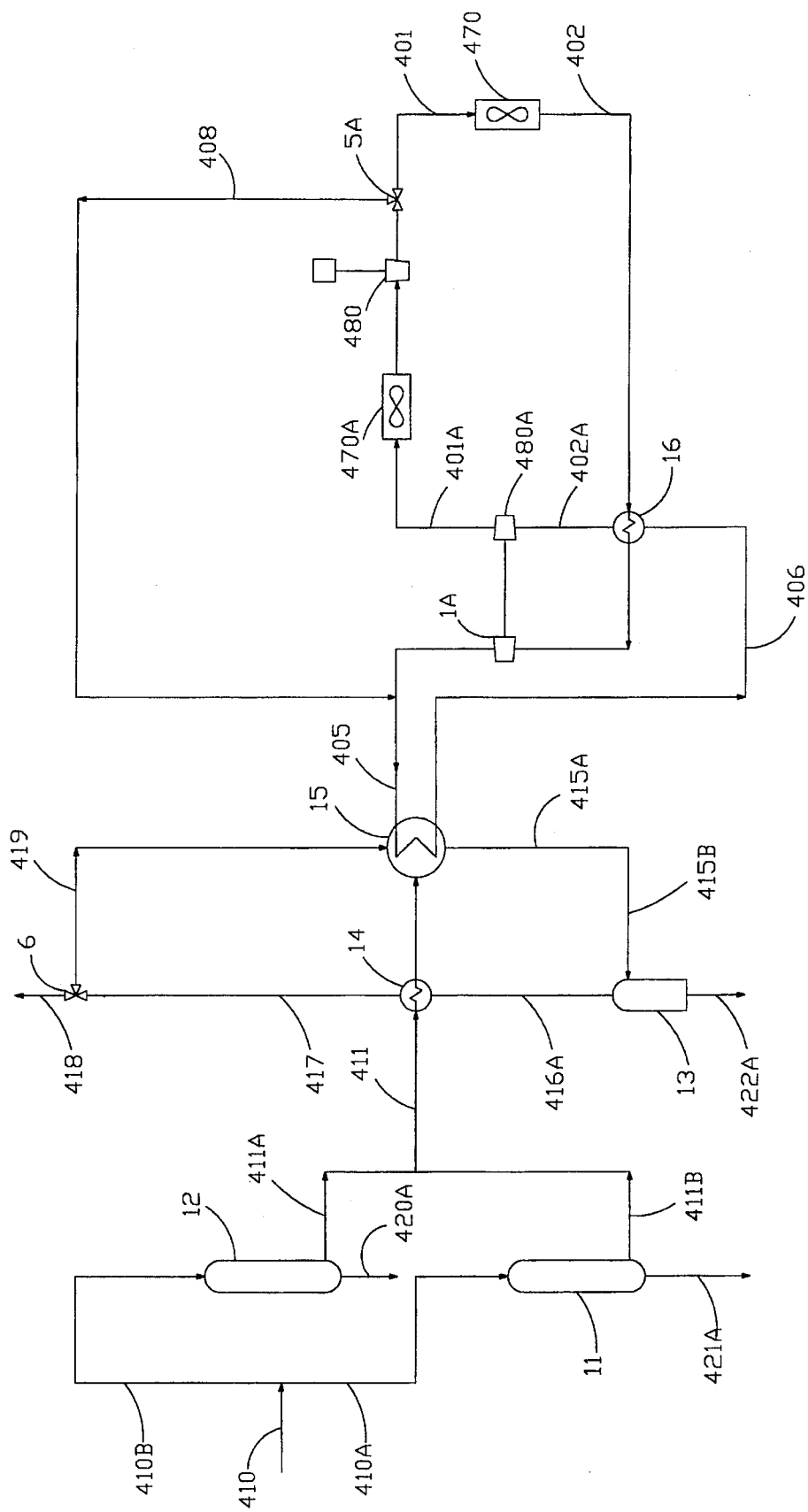
FIG. 2 is a simplified flow diagram of a second vapor recovery system using the defrosting method of the present invention.

FIG. 2 depicts a simplified flow diagram of another vapor recovery system utilizing the defrost cycle of the present invention. The particular embodiment is a modification of the system disclosed in my earlier U.S. Pat. No. 4,923,492 which is hereby incorporated by reference. The system disclosed therein is described herein below with reference to FIG. 2 where the invention had been applied.

In a particular embodiment of the present invention ethane is used as the refrigerant in a closed loop compression, turboexpander cycle to cool air containing hydrocarbons and condense the hydrocarbons for removal.

The air-hydrocarbon vapor mixture containing water is collected in header 410 and passed through flow lines 410A or 410B to one of two dehydrators 11 or 12 to remove most of the water from the vapor. The bulk of the water must be removed to prevent early freezing and plugging of the lines at the temperatures used. The dehydrators 11 and 12 contain a common gas desiccant such as a molecular sieve and are arranged for parallel flow so that the sieve in one may be regenerated while the other is in service. Water is removed from the dehydrators to disposal lines 420A or 421A.

The now substantially dry vapor mixture at substantially atmospheric pressure and temperature is next passed to a precooler 14 via flow line 411 (via line 411A or 411B) where it is cooled to a temperature of about 0° F. by indirect heat exchange with the cold vented air. The vapor mixture is then chilled to a temperature of about −130° F. in vapor chiller 15 wherein about 90+ percent of the condensable hydrocarbons are liquified by indirect heat exchange with the cold refrigerant gas from the refrigerant section. The liquid vapors, containing essentially no water, are recovered in separator 13 and sent to storage through flow line 422A.

The air effluent from the separator 13 is passed via line 416A first to vapor precooler 14 to absorb additional heat from the vapor mixture by indirect heat exchange therewith. The air at temperature of about 60° F. may then be vented to the atmosphere via lines 417 and 418 containing less than about 35 mg/l of condensable hydrocarbons which is well within current EPA limits.

Now turning to the refrigeration cycle, cooling is provided for vapor chiller 15 by the compression-turboexpansion cycle of refrigerant gas, such as ethane. The refrigerant gas is first compressed in recompressor 480A to a temperature of about 170° F. and a pressure of about 100 psig. The refrigerant gas is then carried by flow line 401A to aerial condenser 470A where it is cooled to temperature of about 110° F. at constant pressure, the refrigerant gas is then compressed in a second stage recompressor 480 to a temperature of about 200° F. to a pressure of about 450 psig. The refrigerant gas is then carried by flow line 401 to aerial condenser 470 where it is cooled to temperature to about 110° F. at constant pressure, thereby condensing substantially all of the refrigerant to a liquid. The refrigerant is partially cooled by the returning refrigerant gas via line 406, by indirect heat exchanged in heat exchanger 16 to about 0° F. The refrigerant liquid is then passed via flow line 402A to the inlet side of turboexpander 1A where the refrigerant is expanded essentially isentropically to pressure of about 10 psig and thereby cooled to a cryogenic temperature of less than −100° F. The exiting low pressure refrigerant gas is used to chill the air-vapor mixture via line 405 by indirect heat exchange in vapor chiller 15. The transfer of heat to the refrigerant in chiller 15 raises the temperature of the refrigerant gas to temperature above −100° F. It is then passed via line 406 to heat exchanger 16 to remove any liquid by indirect contact with the liquid refrigerant in line 402 and exiting at 60° F. and 10 psig prior to partially recompressing it to a pressure of about 100 psig in compressor 480A driven by turboexpander 1A. The partially recompressed refrigerant gas is then passed to the suction side of second stage recompressor 480 where the cycle begins anew.

The turboexpander is able through substantially isentropic expansion, which produces work, to cool the refrigerant gas to a cryogenic temperature more easily than a simple Joules-Thomson expansion. Thus the use of the turboexpander will allow a gas to be cooled to −100° F. using less horsepower than would be required in a conventional cascade type refrigeration system. Additionally, the closed loop system provides the same mass flow through both expander 480A and compressor 480 alleviating loading and control problems.

During the vapor recovery cycle, although the bulk of the water has been removed, the chiller may still become clogged with ice from what little water is contained within the vapors. Optionally, the dryers may be omitted, which will definitely result in condensed water freezing on the tube walls of the chiller 15. In either case, the chiller will have to be defrosted. This is achieved in a similar manner as in the cascade type system shown in FIG. 1. That is, three-way control valve 5A is activated to switch the flow of hot gas to by-pass the aerial chiller 470 and around turboexpander 1A via line 408. Three-way control valve 6 is simultaneously activated to recycle the exiting vapors from the separator 13 via flow lines 419, 415A and 415B to return the vapors to separator 13, and thus prevent venting of contaminated vapors. During the defrost cycle the first stage compressor 480A is allowed to free wheel. The hot vapors returning to suction of the second stage compressor 480 are cooled in aerial cooler 470A.

Figure 3:
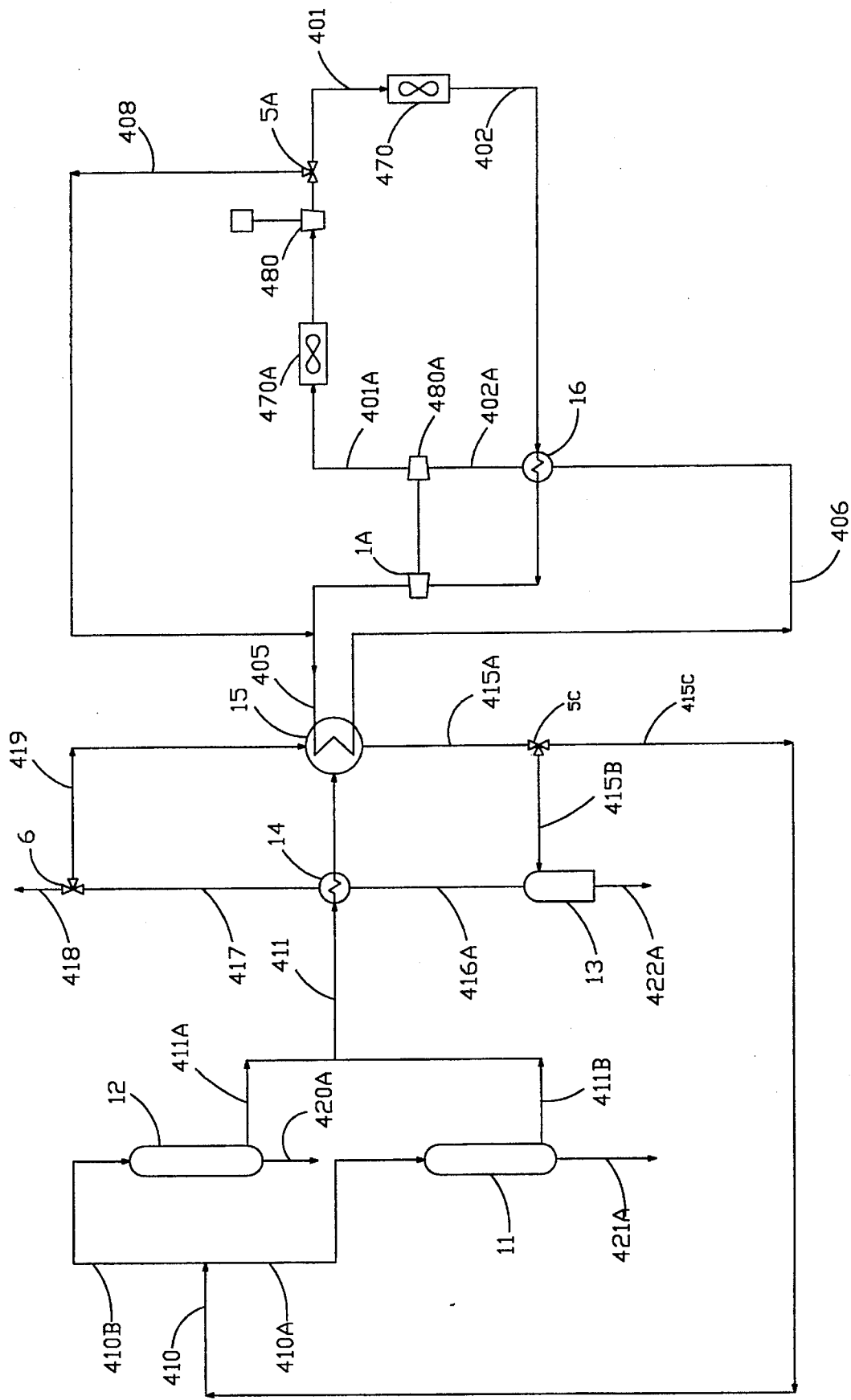
FIG. 3 is a simplified flow diagram of the second vapor recovery system of FIG. 2 with an alternate flow line for drying the desiccant.

FIG. 3 shows a second embodiment of the vapor recovery system of FIG. 2 wherein a portion of the hot vapors exiting heat exchanger 15 is used to dry the molecular sieves contained in driers 11 and 12 by switching the vapor flow through valve 5C from line 415B to line 415C. Flow line 415C carries the hot vapors back to flow line 410 which passes them through either or both of the driers 11 and 12. As in FIG. 2 the exiting vapors are recycled to prevent emission of the hydrocarbon vapors.

Figure 4:
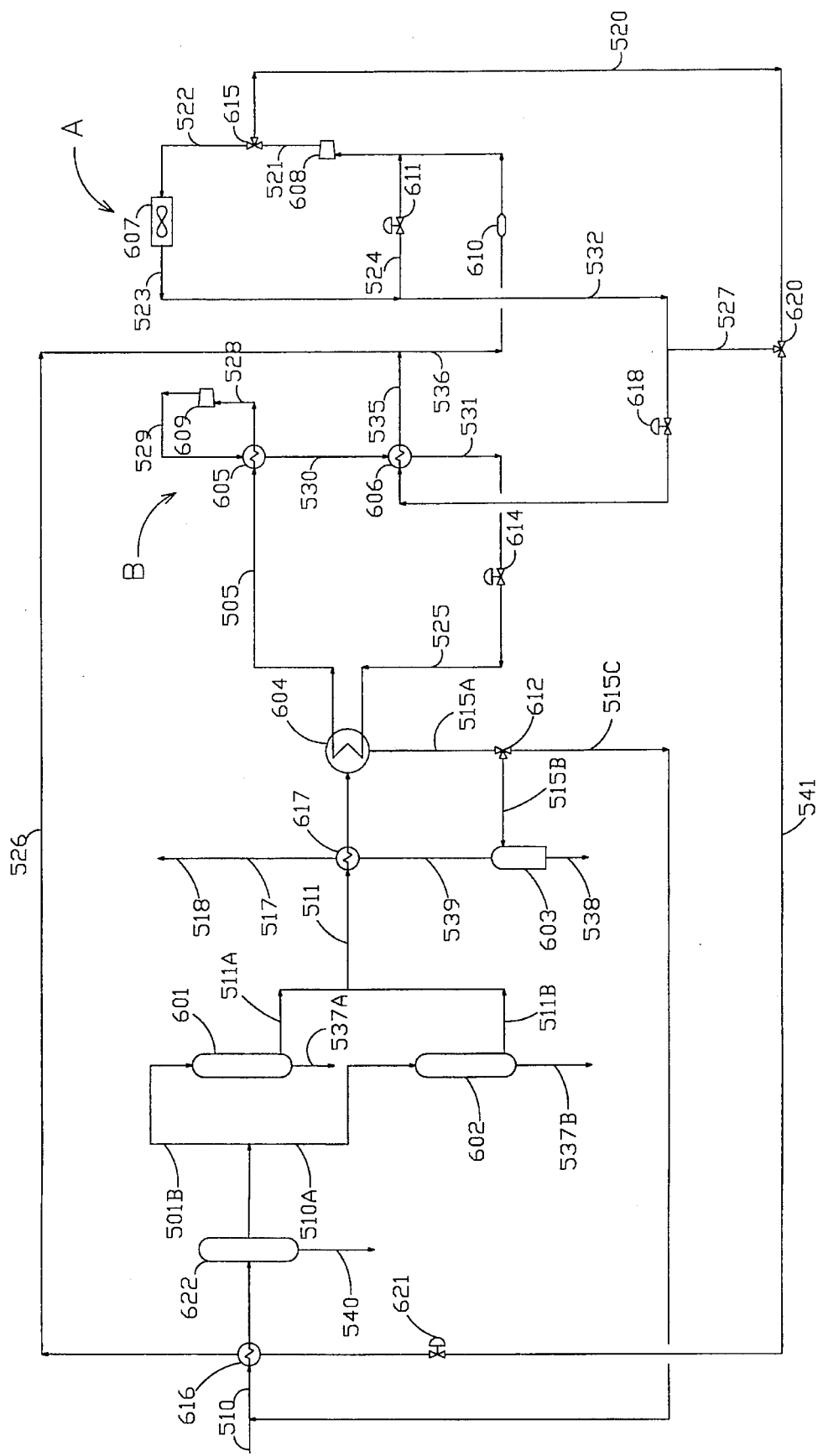
FIG. 4 is a simplified flow diagram of a third vapor recovery system using the defrosting method of the present invention.

FIG. 4 shows yet another vapor recovery system utilizing the cascade system of FIG. 1 to cool the refrigerant to the chiller of the system shown in FIG. 2 and FIG. 3 instead of the ethane gas cycle. The air-hydrocarbon vapor mixture containing water is collected in header 510 and pre-cooled in heat exchanger 616. The pre-cooled vapor is passed through knock-out vessel 622 where any condensed material is removed via drain 540. The pre-cooled vapor is then passed through flow lines 510A or 510B to one or both of two dehydrators 601 or 602 to remove most of the water from the vapor. The bulk of the water must be removed to prevent early freezing and plugging of the lines at the temperatures used. The dehydrators 601 and 602 contain a common gas desiccant such as a molecular sieve and are arranged for parallel flow so that the sieve in one may be regenerated while the other is in service. Water is removed from the dehydrators to disposal lines 537A or 537B.

The now substantially dry vapor mixture at substantially atmospheric pressure and temperature is next passed to a precooler 617 via flow line 511 (via line 511A or 511B) where it is cooled to a temperature of about 0° F. by indirect heat exchange with the cold vented air. The vapor mixture is then chilled to a temperature of about −130° F. in vapor chiller 604 wherein about 90+ percent of the condensable hydrocarbons are liquified by indirect heat exchange with the cold refrigerant gas from the refrigerant section. The liquid vapors, containing essentially no water, are recovered in separator 603 and sent to storage through flow line 538.

The air effluent from the separator 603 is passed via line 539 first to vapor precooler 617 to absorb additional heat from the vapor mixture by indirect heat exchange therewith. The air at temperature of above 32° F. may then be vented to the atmosphere via lines 517 and 518 containing less than about 35 mg/l of condensable hydrocarbons which is well within current EPA limits.

Refrigerant cooling is provided by a cascade refrigeration section having a high temperature section indicated at A and a low temperature section indicated at B. Each stage comprises a compression-condensation-expansion cycle. In the high temperature stage, the refrigerant, Freon R-502 for example, exits the compressor 608 though flow line 521 and is passed to an air cooled condenser 607. The condensed refrigerant from the condenser 607 is passed via flow lines 523 and 532 to the low temperature stage condenser 606 after being expanded across expansion valve 618 to provide the cooling necessary to condense the compressed refrigerant from the low temperature stage system. The high temperature stage refrigerant is returned to the suction of the compressor 608 via flow lines 535 and 536. A slip stream of the compressed condensed refrigerant is taken via flow line 527 through three-way control valve 620 and used to precool the entering vapors in heat exchanger 616 after being expanded across expansion valve 621.

In the low temperature stage the refrigerant, Freon R-503 for example, is compressed by compressor 609 and pre-cooled by indirect heat exchange with the returning refrigerant in exchanger 605 and then condensed by indirect heat exchange with cold refrigerant from the high temperature stage in condenser 606 and then expanded across expansion valve 614 to decrease its temperature to about−130° F. before entering the chiller 604. The returning refrigerant in flow line 528 is passed though heat exchanger 605 where it is heated by indirect heat exchange with hot compressed refrigerant to increase its temperature to about −50° F. before being returned to the suction of compressor 609.

As shown in FIG. 4 a second embodiment of the vapor recovery system similar to FIG. 3 is disclosed wherein a portion of the hot vapors is used to dry the molecular sieves contained in dryers 601 and 602.

The heat pump mode is accomplished by the use of four three-way valves 612, 615 and 620. Flow control valve 615 shifts to allow the hot refrigerant gas exiting the compressor 608 to by-pass the air cooled condenser 607. Three-way valve 620 is shifted to allow the hot refrigerant to enter flow line 541. The hot refrigerant at about 250° F. is passed directly to the precooler 616 where it now heats the incoming air and returns to the compressor suction via flow line 526. Flow control valve 612 shifts the vapors leaving the chiller back to the header 510. Thus during regeneration no emissions are made.

The hot refrigerant gas at a temperature of 250° F. passes through the tubes of the precooler, heating the recirculated air to about 200° F. The heated recirculated air continues through receiver 622, dryer 601 or 602, and precooler 617, defrosting any accumulated ice. The defrost liquids are removed through drains (not shown).

The hot refrigerant gases returning to the high temperature stage compressor 608 are too hot to enter the compressor. The hot gasses are thus passed through desuperheater 610 for expansion and cooling prior to being returned to the compressor suction. Thus the defrost cycle can be achieved without the expensive brine recirculation system now currently in use.

The invention claimed is:

1. A system for removing substantially all of the chemical vapors from an air-chemical vapor mixture, comprising:

(a) a vapor chiller having an inlet and an outlet to condense substantially all of said hydrocarbons or chemicals in said mixture by indirect heat exchange with a refrigerant gas at a cryogenic temperature;

(b) a drain to remove substantially all of said condensed hydrocarbons or chemicals from said vapor chiller;

(c) a vent to remove said air less substantially all of said hydrocarbons from said vapor chiller;

(d) a compressor having an inlet and an outlet to compress said refrigerant gas;

(e) a condenser in fluid connection with the outlet of said compressor to condense substantially all of said refrigerant liquid;

(f) an expansion means in fluid connection with said condenser to reduce the pressure of and expand said refrigerant liquid back to a refrigerant gas thereby reducing the temperature of said refrigerant gas to a cryogenic temperature;

(g) a first fluid connection between said expansion means outlet and said vapor chiller inlet wherein said refrigerant gas is heated by indirect heat exchange with said mixture thereby cooling said mixture;

(h) a second fluid connection between said compressor outlet and said vapor chiller inlet whereby compressed refrigerant gas from said compressor is passed alternative to and exclusive of said first fluid connection directly to said vapor chiller to heat said vapor mixture; and (i) a third fluid connection between said vent and said vapor chiller whereby the vapors may be recycled.

2. The vapor recovery system of claim 1 further comprising a first means associated with said compressor outlet to direct said compressed refrigerant gas to either said first or second fluid connection and a second means associated with said vent to direct the air to the atmosphere or the air-vapor mixture to said third fluid connection.

3. The vapor recovery system of claim 2 wherein said first and second means each comprise a three-way valve.

4. The vapor recovery system of claim 1 wherein said expansion means comprises an expansion valve.

5. The vapor recovery system of claim 1 wherein said expansion comprises a turboexpander.

6. The vapor recovery system of claim 1 further comprising a dehydration means for removing substantially all of the water contained within said mixture, said dehydration means being in fluid communication with the inlet of said vapor chiller.

7. The system of claim 6 wherein said dehydration means comprises at least one vessel, said vessel containing a desiccant, an inlet and an outlet, and a fourth fluid connection between said chiller outlet and the inlet to said vessel whereby hot vapors may be directed to said chiller inlet to regenerate said desiccant.

8. The system of claim 7 wherein said dehydration means comprises a pair of vessels in parallel, each of said vessels containing a desiccant, an inlet and an outlet, said vessels being arranged such that the desiccant in one vessel can be regenerated while the other vessel is operating, said fourth fluid connecting between said chiller outlet and the inlet to each of said vessels whereby hot vapors may be directed to said chiller inlet to regenerate said desiccant.

9. The system of claim 1 further comprising a second compressor for compressing a second refrigerant gas, a second condenser in fluid connection with said second compressor for cooling and condensing said second refrigerant gas, second expansion means in fluid connection to said second condenser for expanding and lowering the temperature of said second refrigerant gas, and a fluid connection between said second expansion means and said first condenser whereby said first refrigerant gas is cooled by indirect heat exchange with said second refrigerant gas.

10. A system for removing substantially all of the hydrocarbons or chemical vapors from an air-chemical vapor mixture, comprising:

(a) a vapor collection conduit;

(b) a heat exchanger for indirectly exchanging heat between said air-vapor mixture and a refrigerant gas, said heat exchanger having a vapor mixture inlet connected to said vapor collection conduit, a vapor mixture outlet, a refrigerant gas inlet and a refrigerant gas outlet, (c) a refrigeration system comprising
(i) a compressor having an suction side and a discharge for compressing a refrigerant gas,
(ii) a condenser connected to the discharge of said compressor for condensing said refrigerant gas, and
(iii) an expansion means having a high pressure inlet side and a low pressure outlet side, connected on the high pressure side to said condenser for expanding and reducing the temperature of said refrigerant gas, and
(iv) a conduit connecting the low pressure side of said expansion means to said refrigerant inlet;

(d) a hot vapor by-pass conduit connecting the discharge of said compressor directly to said refrigerant gas inlet;

(e) an air-vapor mixture recycle conduit connecting said air-vapor mixture outlet to said air-vapor mixture inlet; and (f) first means to alternatively direct the compressed refrigerant gas to said condenser or said hot vapor by-pass conduit.

11. The system of claim 10 further comprising a vent connected to said air-vapor mixture outlet and a second means to alternatively direct said air to said vent or said air-vapor mixture to said recycle conduit.

12. The system of claim 11 wherein said first and second means comprises a first and second three-way valve respectively.

13. The system of claim 10 further comprising a desuperheater connected by a desuperheater inlet to said refrigerant outlet and by a desuperheater outlet to the suction side of said compressor.

14. A system for removing substantially all of the hydrocarbons or chemical vapors from an air-chemical vapor mixture, comprising:

(a) a vapor collection conduit;

(b) a heat exchanger for indirectly exchanging heat between said air-vapor mixture and a refrigerant gas, said heat exchanger having an air-vapor mixture inlet connected to said vapor collection conduit, an air-vapor mixture outlet, a refrigerant gas inlet and a refrigerant gas outlet, (c) a vent connected to said air-vapor mixture outlet;

(d) a refrigeration system comprising
(i) a compressor having a suction side and a discharge, for compressing a refrigerant gas,
(ii) a condenser connected to the discharge of said compressor for condensing said refrigerant gas, and
(iii) an expansion means having a high pressure side and a low pressure side, connected on the high pressure side to said condenser for expanding and reducing the temperature of said refrigerant gas, and
(iv) a conduit connecting the low pressure side of said expansion means to said refrigerant gas inlet;

(e) a hot vapor by-pass conduit directly connecting the discharge of said compressor to said refrigerant inlet;

(f) an air-vapor mixture recycle conduit connecting said air-vapor mixture outlet to said vapor mixture inlet;

(g) a first three-way valve operably connected to the discharge of said compressor for alternatively directing said refrigerant gas to said condenser or said hot vapor by-pass conduit;

(h) a second three-way valve operably connected to said air-vapor mixture outlet for alternatively directing said air to said vent or said air-vapor mixture to said air-vapor mixture recycle conduit; and (i) a desuperheater connected by a desuperheater inlet to said refrigerant outlet and by a desuperheater outlet to the suction side of said compressor.

* * * * *